United States Patent
Sok et al.

(10) Patent No.: US 11,126,255 B1
(45) Date of Patent: Sep. 21, 2021

(54) POWER THROTTLING BASED ON INPUT VOLTAGE MONITORING

(71) Applicant: Microsoft Technology Licensing, LLC, Redmond, WA (US)

(72) Inventors: Banha Sok, Kirkland, WA (US); Rameez Kadar Kazi, Bellevue, WA (US); Mark Andrew Shaw, Sammamish, WA (US); Fredrick Anthony Constantino, Black Diamond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/915,975

(22) Filed: Jun. 29, 2020

(51) Int. Cl.
*G06F 1/32* (2019.01)
*G06F 1/3287* (2019.01)
*G06F 1/324* (2019.01)

(52) U.S. Cl.
CPC ............ *G06F 1/3287* (2013.01); *G06F 1/324* (2013.01)

(58) Field of Classification Search
CPC ............................... G06F 1/3287; G06F 1/324
See application file for complete search history.

(56) References Cited

U.S. PATENT DOCUMENTS

| | | | |
|---|---|---|---|
| 9,280,191 B2 | 3/2016 | Rahardjo et al. | |
| 9,461,709 B2 | 10/2016 | Griffith et al. | |
| 9,727,108 B2 | 8/2017 | Bandholz et al. | |
| 9,753,520 B2 | 9/2017 | Bailey et al. | |
| 2006/0161794 A1* | 7/2006 | Chiasson | G06F 1/28 713/300 |
| 2015/0177813 A1* | 6/2015 | Bailey | G06F 1/263 713/320 |
| 2015/0381237 A1* | 12/2015 | Griffith | G06F 1/3206 375/258 |
| 2016/0274638 A1* | 9/2016 | Kwon | H04L 43/08 |
| 2017/0126505 A1* | 5/2017 | Cencini | H04L 67/22 |

FOREIGN PATENT DOCUMENTS

| | | |
|---|---|---|
| CN | 107908583 A | 4/2018 |
| CN | 110147155 A | 8/2019 |

* cited by examiner

*Primary Examiner* — Stefan Stoynov
(74) *Attorney, Agent, or Firm* — Ray Quinney & Nebeker; James Bullough

(57) ABSTRACT

The present disclosure relates to systems, methods, and computer readable media for enabling a power shelf unit to communicate a power throttle signal to devices of a power rack (or other grouping of devices) via a busbar. In particular, systems disclosed herein involve detecting a trigger condition associated with throttling power on server devices of a server rack. In response to detecting the trigger condition, systems here cause a direct current (DC) power supply voltage to change from an operating voltage to a notification voltage for a period of time to alert or otherwise communicate to server devices coupled to the busbar of the trigger condition. Causing the DC power supply voltage to change to the notification voltage may cause processors on server devices to throttle power consumption in accordance with one or more power capping policies implanted thereon.

20 Claims, 8 Drawing Sheets

POWER THROTTLING BASED ON INPUT VOLTAGE MONITORING

BACKGROUND

A cloud computing system refers to a collection of computing devices on which data can be remotely stored and accessed. For example, modern cloud computing infrastructures often include a collection of physical server devices organized in a hierarchical structure including computing zones, clusters, virtual local area networks (VLANs), racks, fault domains, etc. Cloud computing systems often make use of different types of virtual services (e.g., computing containers, virtual machines) that provide remote storage and computing functionality to various clients and customers. These virtual services can be hosted by respective server nodes on a cloud computing system.

As demand for cloud computing resources continues to grow, and as network devices become more complex, systems for providing reliable power resources have encountered a number of difficulties. For example, as demand for cloud computing systems grows, an increasing number of network devices contribute to cumulative power consumption on the cloud. Moreover, as network devices increase in complexity and capability, standards for providing power supplies continue to change and adapt. As a result, conventional power supply systems have become outdated or insufficient for many new devices being added to cloud computing systems.

As an example, many power supply systems have transitioned from providing an alternating current (AC) power signal to server devices (e.g., to be converted to a direct current signal using local circuitry) to providing a previously converted direct current (DC) power signals to server devices. As another example, many power supply systems have adapted to changing technologies by changing a voltage or current of a supply signal provided to various server devices. As will be discussed in further detail herein, these and other developments to cloud computing networks have caused significant space constraints related to enabling devices within a confined space from communicating with one another.

These and other problems exist with regard to providing reliable and consistent power resources to devices of cloud computing systems.

DETAILED DESCRIPTION

Figure 1:
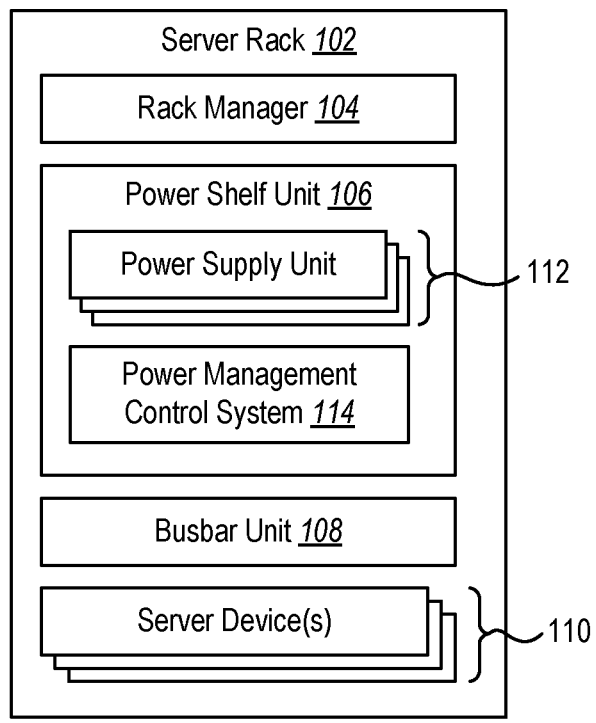
FIG. 1 illustrates an example environment of a server rack including a power shelf unit having a power management control system in accordance with one or more implementations.

The present disclosure is generally related to a power shelf unit (e.g., on a server rack) that includes a power management control system for generating and providing a power throttle signal in response to various trigger conditions. In particular, where a power supply signal is provided as a supply voltage via a busbar (or other similar power distribution device), a power management control system may be used to communicate a power throttle signal or other alerts from a power shelf unit to devices (e.g., server devices) coupled to the power shelf unit via the busbar. For example, as will be discussed in further detail below, a power management control system may detect a trigger condition associated with throttling power on one or more server devices and communicate an alert to the server device(s) via the busbar.

For example, in one or more embodiments, the power management control system (and/or respective server devices) may maintain a power capping policy including instructions or other data related to managing power consumption of server devices of a server rack. The power management control system may identify a trigger condition associated with throttling power consumption on the server devices. In response to the trigger condition, the power management control system can cause a direct current (DC) power supply signal on a busbar to change from an operating voltage to a notification voltage for some predetermined period of time to notify server devices coupled to the busbar of the trigger condition and cause processor(s) on the server devices to throttle power consumption thereon.

As another example, in one or more embodiments, a server device coupled to a power shelf (e.g., on a server rack) may maintain a power capping policy associated with managing power consumption on the server device. The server device may detect a change in voltage of the busbar to a notification voltage (e.g., from an operating voltage) and generate a throttle alert based on the detected change in voltage. Based on the alert, the server device may throttle power consumption in accordance with the power capping policy.

As will be discussed in further detail below, the present disclosure includes a number of practical applications having features described herein that provide benefits and/or solve problems associated with managing power consumption and, more particularly, selectively throttling power consumption on server devices of a cloud computing system. Some example benefits are discussed herein in connection with various features and functionality facilitated by a power management control system. Nevertheless, it will be understood that benefits explicitly discussed in connection with one or more implementations are provided by way of example and are not intended to be a comprehensive list of all possible benefits of the power management control system.

For example, as mentioned above, an increasing number of server racks and server devices make use of a busbar to provide power to devices thereon. Use of a busbar in accordance with one or more embodiments described herein provides various benefits, such as a reliable power source to multiple devices, more physical space within the server rack, and reduced complexity of connections between network devices. For example, use of the busbar in combination with power supply units on a power shelf unit may provide a convenient and reliable source of DC power to devices of the cloud computing system. Moreover, busbars may be used to provide higher voltage supply signals than many conventional server racks.

The power management control system may further utilize the busbar to communicate a throttle notification to devices of the cloud computing system. For example, rather than selectively communicating one or more signals via dedicated side-band channels or via other connection devices that further limit space within the limited-space environment on a server rack, the power management control system may communicate a throttle signal by modifying a voltage of the busbar from an operating voltage (e.g., 50 Volts (V)) to a notification voltage (e.g., a higher or lower voltage than the operating voltage) without interrupting operation of devices receiving supply power from the busbar.

Communicating a command or otherwise notifying the server device(s) to throttle power consumption via the busbar rather than a sideband channel (or other communication medium) further enables the power shelf unit to quickly and reliably communicate with one or more server device(s). In particular, rather than relying on potentially unreliable connections (e.g., side-band channels and/or wireless communication) to communicate a command to throttle one or more processors, the power management control system can communicate the throttle command via the DC power supply. Not only does this provide a secure and reliable communication medium independent of a variety of communication conditions that could prevent or delay communication between devices, communicating signals via the busbar can be done more quickly than a number of conventional communication techniques (e.g., within a few milliseconds (ms)).

Furthermore, the systems described herein provide a simple and effective communication mechanism between devices of a server rack without decreasing or otherwise removing functionality of the server rack. For instance, even where an updated server rack that includes the busbar simplifies aspects of communicating between devices (e.g., by removing side-band channels and/or removing dedicated connections between devices), features and functionality described herein enable the power management control system to communicate a variety of commands of different types via the busbar. Additional information in connection with example techniques for communicating throttle commands and other communications between the power shelf and the server device(s) will be discussed below.

As illustrated in the foregoing discussion, the present disclosure utilizes a variety of terms to describe features and advantages of the systems described herein. Additional detail is now provided regarding the meaning of some of these terms. For example, as used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc.

In one or more embodiments described herein, a cloud computing system may include a set of server nodes or plurality of devices that share an electrical infrastructure. For example, in one or more embodiments described herein, a plurality of server devices may refer to one or more specific groupings of devices having one or more power shelfs that provide power to server devices within a grouping of devices (e.g., a server rack). In one or more implementations described herein, a server rack may be one of a plurality of server racks within a datacenter, region of datacenters, or a colocation center (e.g., a datacenter colo) having a distributed redundant electrical infrastructure.

Each device or grouping of devices (e.g., server rack(s), datacenter colo), may operate in accordance with a power capping policy. As used herein, a "power capping policy" may refer to any information associated with management of power on one or more server devices. For instance, a power capping policy may include instructions associated with managing power consumption on a server device, a server rack, a datacenter colo, or other grouping of device(s). In one or more embodiments described herein, a power capping policy refers to a set of rules or instructions associated with throttling power consumption of one or more processors on a device and/or grouping of devices. For instance, a power capping policy may include a policy to throttle a clock speed for a processor or device(s) based on power consumption for a device or grouping of devices exceeding a threshold level (e.g., a threshold wattage of power consumption).

As used herein, a "busbar" or "busbar unit" may refer interchangeably to a conductive device capable of distributing power to one or more devices coupled to the busbar. A busbar may be made using a variety of materials including, by way of example, a metallic strip or bar and may have a variety of current and voltage capacity in accordance with one or more embodiments. In one or more embodiments described herein, a busbar may refer to a bar, strip, or other piece of copper capable of delivering approximately a 50 V power supply (or other operating voltage) to any number of server devices on a server rack.

As will be discussed herein, the busbar may have a supply voltage (e.g., a DC power supply voltage) that fluctuates or can be modified in accordance with one or more embodiments. For example, the busbar may be set at or otherwise operate at an operating voltage. As used herein, an "operating voltage" may refer to any reference voltage corresponding to normal operating conditions of devices on a power rack (e.g., where the server devices are not throttling power consumption or otherwise under instructions to throttle power consumption). In one or more implementations described herein, an operating voltage refers to a voltage of approximately 50V.

As will be discussed herein, the operating voltage may be changed to a notification voltage based on one or more trigger conditions. As used herein, a "notification voltage" may refer to any voltage other than an operating voltage that may be used to signal to one or more devices of an identified trigger condition. In one or more implementations described herein, a notification voltage refers to a changed voltage from the operating voltage within a small measure of potential change (e.g., 1-2 volts, 5% of the operating voltage) from the operating voltage. For instance, the notification voltage may refer to a change in voltage within a threshold potential of the operating voltage that enables the server device(s) to continue operation of virtual machines and/or applications running thereon. The specific change or difference between the operating and notification voltage may be based on specifications of devices and/or operating parameters or other requirements of specific virtual machines hosted on the respective server devices.

Additional detail will now be provided regarding a power management control system and server device(s) on a server rack in relation to illustrative figures portraying example implementations. For example, FIG. 1 illustrates an example server rack 102. The server rack 102 may refer to a server rack implemented as part of a datacenter, datacenter colo, or other grouping of devices with a cloud computing system. The server rack 102 may include a rack manager 104, a power shelf unit 106, a busbar unit 108, and any number of server devices 110. As further shown, the power shelf unit 106 may include a power management control system 114 and a plurality of power supply units 112.

The rack manager 104 may include one or more processors and may generally manages operation of a collection of server devices 110 (e.g., server nodes) on the server rack 102. For example, the rack manager 104 can execute instructions and make local decisions regarding deployment of virtual machines and other services. In addition, the rack manager 104 can provide hardware (e.g., switches, routers) that provide an interface whereby devices of the server rack 102 may communicate with one another and/or with other devices on other server racks of a datacenter colo and/or cloud computing system.

In one or more embodiments, the rack manager 104 provides features related to managing power consumption on devices of the server rack 102. For example, in one or more embodiments, the rack manager 104 provides an interface (e.g., a front-end interface) that enables an individual or system administrator to set one or more preferences associated with power consumption on the devices of the server rack 102. For instance, the rack manager 104 can receive policy information (e.g., power capping policy information) associated with threshold power consumption levels for the server rack 102, the power shelf unit 106 generally, individual power supply units 112, and/or the server devices 110. In one or more embodiments, the rack manager 104 provides the policy information (e.g., power capping policies) to the power shelf unit 106 and/or server device(s) 110 to be implemented thereon, which will be discussed in further detail below.

As mentioned above, the server rack 102 may include a power shelf unit 106. The power shelf unit 106 may refer to a shelf or other device that fits within the server rack 102 and facilitates providing power to server devices 110 on the server rack 102. For example, the power shelf unit 106 may include a number of power supply units 112 that provide power sources to the server devices 110. In one or more embodiments, the power shelf unit 106 includes twelve power supply units 112. Nevertheless, the power shelf unit 106 may include any number of power supply units 112 thereon (e.g., fewer or more than twelve units).

In one or more embodiments, the power supply units 112 provide direct current (DC) power sources to server device(s) 110 of the server rack 102. For instance, the power supply units 112 may receive alternating current (AC) power from a power source (e.g., an external power source powering the server rack 102 generally). The power supply units 112 may include AC/DC converters to convert an AC supply signal to a DC voltage supply signal provide to providing the power signal to the server devices 110. As will be discussed below, the power supply units 112 may be coupled to the busbar unit 108 and provide a supply voltage to the server devices 110 via the busbar unit 108.

As further shown in FIG. 1, the power shelf unit 106 may include a power management control system 114. The power management control system 114 can implement any number of features and functionality described herein in connection with enforcing a power capping policy and causing power throttling of any number of server devices 110 in accordance with the power capping policy. For example, the power management control system 114 can receive a power capping policy indicating a power consumption threshold for the server rack 102. For instance, in one or more embodiments, the power management control system 114 maintains a power capping policy that indicates a threshold power consumption of thirty-six (36) kilowatts (kW) for the server rack 102 (or for the power shelf unit 106). In one or more embodiments, the power capping policy indicates a threshold power consumption of three (3) kWs for each of the power supply units 112. In one or more embodiments, the power capping policy includes a threshold power consumption applicable to one or more of the server devices 110.

Each of the threshold power consumption values may act as trigger conditions that trigger throttling power consumption on one or more devices of the server rack 102. For example, in one or more embodiments, the power management control system 114 may monitor power utilization on the server rack 102 and implement one or more power throttling actions in accordance with the power capping policies. For instance, the power management control system 114 can determine that one or more individual power supply units 112 is operating at or above a power consumption threshold. As another example, the power management control system 114 may determine that a set of power supply units 112 are collectively operating at or above a power consumption threshold. As another example, the power management control system 114 may receive an indication from an external device, such as a server device of a datacenter colo, indicating that power consumption on a collection (e.g., a row) of server racks or other grouping of devices within a common power domain has exceeded a power consumption threshold. Other implementations may include notifications from the rack manager 104, server devices 110, or other devices of a cloud computing system indicating one or more trigger conditions associated with throttling power consumption on the server rack 102.

As mentioned above, and as will be discussed herein, the power management control system 114 can implement one or more power throttling actions on the server rack 102. As used herein, "power throttling" or a "power throttling action" may refer to any action on the server rack 102 that causes server devices thereon to utilize a lower quantity of power. For instance, in one or more embodiments described herein, power throttling involves causing one or more processors on server device(s) 110 to run at a lower processing speed. This may include lowering a speed of a clock cycle (e.g., from over 3 gigahertz (GHz) to 700 megahertz (MHz)). Indeed, power throttling may involve any number of power capping actions that involve slowing down operation of one or more devices on the server rack 102.

While one or more embodiments described herein relate to implementing power throttling actions such as slowing down processing speeds of server device(s) 110, power throttling actions may further include power shedding actions or other types of power reducing actions. For instance, a power throttling action may include a power shedding action, such as selectively shutting down one or more server device(s) 110 and/or temporarily shutting off a set of devices or services on the server rack 102. Accordingly, one or more embodiments described in connection with power capping actions (e.g., reducing processor speed or otherwise throttling processor performance on server devices) may similarly apply to performing power shedding actions, such as powering down server devices, decommissioning virtual machines on one or more server devices, or performing any action indicated by the power capping policy that reduces power consumption on the server rack 102.

As further shown in FIG. 1, the server rack 102 includes a busbar unit 108 and server devices 110. As discussed above, the busbar unit 108 may include a metal strip or piece of metal coupled to the rack manager 104, the power shelf unit 106 (e.g., via each of the power supply units 112), and the server device(s) 110. In one or more embodiments, the busbar unit 108 refers to a bar or strip of copper or other conductive material capable of providing a DC power supply signal(s) from the power supply units 112 to the rack manager 104 and/or server device(s) 110.

As indicated in FIG. 1, the server rack 102 includes a set of server devices 110 having processors thereon. In one or more embodiments, the server devices 110 refer specifically to server nodes including compute cores that are capable of hosting one or more virtual machines, computing containers, and other cloud computing services. Nevertheless, it will be understood that the server devices 110 may refer to a variety of computing devices or other network devices. For example, the server devices 110 may refer to computing devices on a computing network that provides services to local clients connected to the server rack 102. Alternatively, the server devices 110 may refer to server nodes on a cloud computing infrastructure for providing remote services to any number of internal or external clients.

In addition, while one or more embodiments described herein relate to providing a throttle alert or other notification(s) between devices via the busbar unit 108, it will be understood that one or more communications may be transmitted between devices of the server rack 102 via other communication mediums or channels. For example, in one or more embodiments, the power shelf unit 106 includes an Ethernet interface (or other communication interface) whereby the rack manager 104 may communicate data with the power management control system 114 via an Ethernet connection. The rack manager 104 may similarly provide a variety of communications to the server devices 110 via communication channels (e.g., wired, wireless) other than the busbar unit 108. As an example, in one or more embodiments, the rack manager 104 communicates information for one or more power capping policies via a communication interface other than the busbar unit 108.

Figure 2:
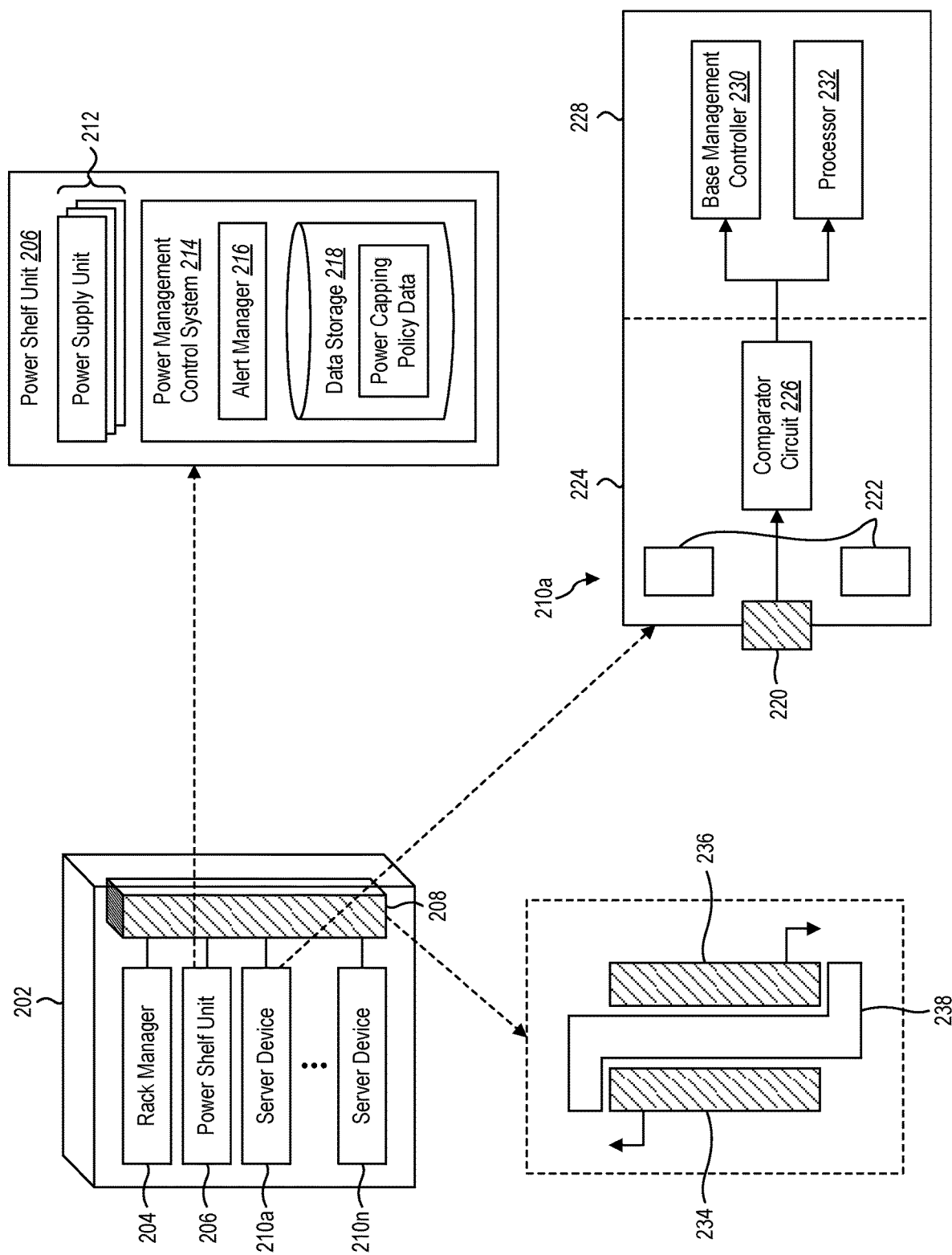
FIG. 2 illustrates another example server rack including a power shelf unit, server devices, and a busbar in accordance with one or more implementations.

While FIG. 1 illustrates an example implementation within a block diagram to illustrate discrete components of an example implementation of a server rack 102, FIG. 2 provides an illustrative implementation of a server rack in accordance with one or more embodiments described herein. For example, FIG. 2 illustrates an example server rack 202 including a rack manager 204, a power shelf unit 206, a busbar unit 208, and server devices 210a-n implemented within a housing of the server rack 102. Each of the rack manager 204, power shelf unit 206, busbar unit 208, and server devices 210a-n may include similar features and functionality as corresponding components discussed above in connection with FIG. 1.

Additional detail will now be discussed in connection with some of the individual components of the server rack 202. For example, FIG. 2 illustrates an example implementation of the power shelf unit 206 including a plurality of power supply units 212 and a power management control system 214. As shown in FIG. 2, the power management control system 214 may include an alert manager 216 and a data storage 218 having power capping policy data thereon.

As will be discussed in further detail below, the alert manager 216 may implement or execute instructions from a power capping policy based on detecting or otherwise identifying a trigger condition associated with throttling power consumption on the server rack 202. For example, in response to receiving a notification that a trigger condition exists (e.g., that one or more power supply units 212 are operating above a threshold power consumption level), the alert manager 216 may cause a DC power supply on the busbar unit 208 to change from an operating voltage (e.g., 50 V) to a notification voltage (e.g., 48 V, 52 V). As will be discussed in further detail below, the change in the voltage on the busbar unit 208 provides an alert of the trigger condition to the server device(s) 210a-n and causes the server devices 210a-n to implement a corresponding power throttle action in accordance with a power capping policy.

As shown in FIG. 2, the data storage 218 may include power capping policy data associated with management of power consumption on the server rack 202, the power supply units 212 and/or any of the individual server devices 210a-n. While FIG. 2 illustrates an example in which the power capping policy data is maintained on the power shelf unit 106, other implementations may include power capping policy data maintained on the rack manager 104 and/or on respective server devices 210a-n of the server rack 202. In one or more embodiments, each of the server devices 210a-n may maintain respective power capping policies thereon that include the same information and/or additional information as the power capping policy data maintained on the power shelf unit 106. Indeed, each of the server devices 210a-n may maintain different or otherwise unique power capping policies thereon depending on specifications of the individual devices and/or characteristics of virtual machines and/or services hosted thereon.

FIG. 2 additionally illustrates an example implementation of components within a first server device 210a. In particular, as shown in FIG. 2, the first server device 210a may include a busbar interface 220 to electrically connect components of the server device 210a to the busbar unit 208. The busbar interface 220 may include a similar metallic or otherwise conductive material as the busbar unit 208. In one or more embodiments, the busbar interface 220 has a shape that enables the server device 210a to have a secure connection with the busbar unit 208 when the server device 210a is placed within a corresponding slot on the server rack 202. In accordance with one or more embodiments described herein, the busbar interface 220 provides an interface through which a voltage signal (e.g., a power supply signal) may pass through and provide power to components on the server device 210a.

As further shown, the server device 210a may include one or more fans 222. The fans 222 may provide a cooling mechanism to components on the server device 210a. While FIG. 2 shows an example including two fans 222, the server device 210a may include any number of fans thereon to provide cooling to components on the server device 210a. The fans 222 may alternatively be replaced or supplemented by other forms of cooling (e.g., liquid cooling, heat syncs, etc.) within the server device 210a itself or provided within the infrastructure of the server rack 202.

As shown in FIG. 2, the server device 210a may include multiple regions representative of receiving a power supply signal, converting the power supply signal to a device-specific voltage, and providing a throttle signal (if applicable) to components on the server device 210a. For example, in the example shown in FIG. 2, the server device 210a includes a DC/DC converter stage 224 having a comparator circuit 226 thereon. The DC/DC converter stage may convert a DC voltage signal provided from the busbar unit 208 to a DC voltage configured to power respective components on the server device 210a. By way of example and not limitation, in one or more implementations, the DC/DC converter stage 224 includes circuitry for converting the DC/DC signal from a 50V power supply signal to a 12V power supply signal (e.g., based on power ratings of individual components on the server device 210a).

As shown in FIG. 2, the server device 210a includes a comparator circuit 226. In one or more embodiments described herein, the comparator circuit 226 observes a voltage of the supply voltage from the busbar unit 208 to determine whether a trigger condition has been detected or otherwise identified (e.g., by the power shelf unit 206). More specifically, in one or more embodiments, the comparator circuit 226 monitors a voltage from the busbar unit 208 to determine whether the DC power supply signal from the busbar unit 208 changes from an operating voltage (e.g., 50 V) to a notification voltage (e.g., 48 V, 52 V). Where the comparator circuit 226 determines that the operating voltage has changed to a notification voltage, the comparator circuit 226 can generate an alert or other signal to indicate detected change in voltage of the DC power supply signal. In one or more embodiments, the comparator circuit 226 generates a comparator alert indicating the change in voltage.

In addition to generally detecting the change in voltage and generating a comparator alert, the comparator circuit 226 may additionally determine whether the change in voltage corresponds to a power capping policy associating with throttling power consumption on the server device 210a. In one or more embodiments, the comparator circuit 226 makes use of a hotsock controller or other component configured to generate a throttle signal based on a power capping policy in accordance with one or more embodiments. As shown in FIG. 2, the comparator circuit 226 can provide the throttle alert to additional components on the server device 210a.

As shown in FIG. 2, the server device 210a includes a main board 228 (e.g., a motherboard) including a base management controller 230 and a processor 232. As further shown, the comparator circuit 226 can provide the throttle alert to each of the base management controller 230 and the processor 232 to signal to the respective components to begin throttling power consumption on the server device 210a.

In response to receiving the alert signal, the base management controller 230 and/or the processor 232 can throttle power consumption on the server device 210a. In one or more embodiments, the processor 232 slows down and cycles at a predetermined frequency (e.g., 700 MHz) for a predetermined period of time. In one or more embodiments, the processor 232 slows down operation until receiving an updated command or notification to stop throttling power consumption. For instance, a rack manager 204 and/or power shelf unit 206 may communicate a command to stop throttling via an ethernet packet communicated to the base management controller 230 (e.g., using an ethernet connection between the devices on the server rack 202). Alternatively, the processor 232 may slow down operation for a specific duration indicted by the applicable power capping policy.

While FIG. 2 discusses causing a first server device 210a to implement a power throttling action in accordance with one or more embodiments, it will be understood that each of the server devices 210a-n may similarly implement one or more power throttling actions based on the busbar unit 208 changing between an operating voltage and a notification voltage using a similar mechanism. Indeed, each of the server devices 210a-n within the same power domain may implement power throttling based on the change in voltage on the busbar unit 208 in accordance with one or more embodiments described herein.

As mentioned above, the busbar unit 208 may include a metal bar, such as a copper bar, capable of carrying a DC voltage signal to components and devices of the server rack 202. As shown in FIG. 2, in one or more implementations, the busbar unit 208 includes first and second metal strips 234, 236 separated by an insulation layer 238. The first metal strip 234 may be set at the operating voltage (or the notification voltage) while the second metal strip 236 provides a reference voltage, such as a ground voltage. The insulation layer 238 provides a barrier between the strips and prevents the supply and ground voltages from connecting or otherwise causing a short circuit and damaging components on the server rack 202. The busbar unit 208 may include additional components including plastic support, rubber strips, a metal case, fastening elements, or any other elements that enable the busbar unit 208 to fit securely within the server rack 202 and for respective devices of the server rack 202 to interface with the busbar unit 208 via a secure and reliable connection.

Figure 3:
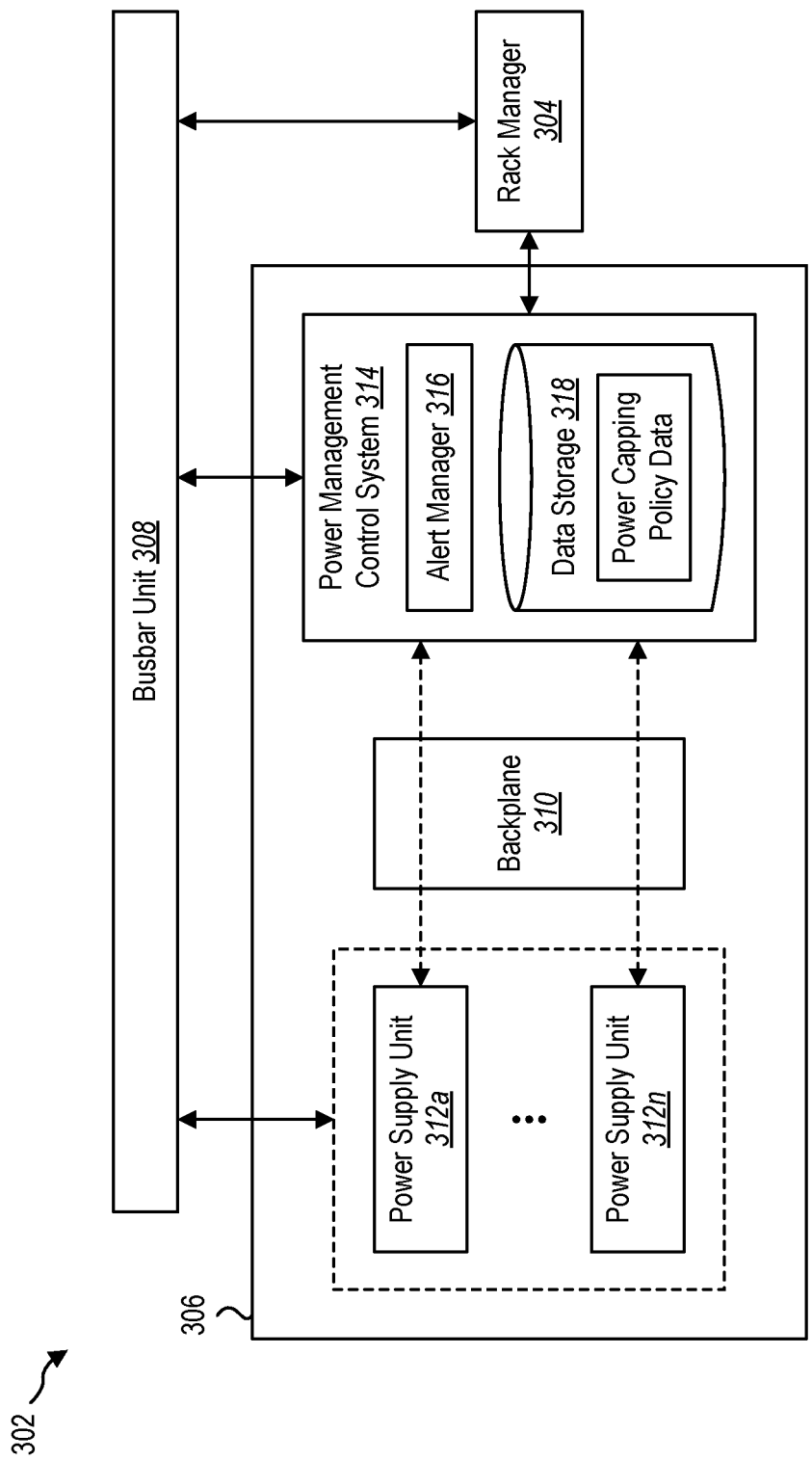
FIG. 3 illustrates an example schematic diagram of a power management control system in accordance with one or more implementations.

FIG. 3 provides a schematic illustration of the components discussed above in connection with FIGS. 1-2. In particular, FIG. 3 illustrates a schematic diagram of a server rack 302 including similar components discussed above. For example, as discussed above, the server rack 302 can include a rack manager 304 coupled to a power shelf 306 and a busbar unit 308. As mentioned above, the rack manager 304 may be coupled to the busbar unit 308 via a power interface capable of receiving a DC power supply signal from the busbar unit 308. Further, the rack manager 304 may be coupled to a power management control system 314 on the power shelf 306 via an ethernet connection or other communication channel capable of transmitting data between the respective devices.

As shown in FIG. 3, the power shelf 306 may include power supply units 312a-n, a backplane 310, and a power management control system 314. The power management control system 314 and the power supply units 312a-n may be coupled to the busbar unit 308. Similar to one or more embodiments described above the power shelf 306 may include any number of power supply units 312a-n (e.g., 12 power supply units). In addition, as discussed above, the power management control system 314 can include an alert manager 316 and a data storage 318 having power capping policy data accessible thereon. In one or more embodiments, each of the server devices may similarly include power capping policy data stored thereon.

As shown in FIG. 3, the power supply units 312a-n may each be connected to the power management control system 314 via a backplane 310. In one or more embodiments a hardware signal is distributed between the power supply units 312a-n and the power management control system 314 via hardware of the backplane 310. For example, in one or more embodiments, AC power is distributed via the backplane 310 and converted to a DC power signal on the power supply units 312a-n. In one or more embodiments, the backplane 310 provides connections between each of the discrete components within the power shelf 306.

As mentioned above, the power management control system 314 may observe power conditions and/or receive notifications associated with whether the server rack 302 (or specific devices on the server rack 302) are experiencing a trigger condition that merits throttling power on the server rack 302. For example, in one or more embodiments, the power management control system 314 receives a notification from the rack manager 304 (e.g., received from a remote server on the same datacenter colo) indicating that the datacenter colo and/or the server rack 302 is operating at or above a threshold power level (e.g., a threshold number of watts). In addition, or as an alternative, the power management control system 314 can receive a notification from one or more power supply units 312a-n indicating the one or more of the power supply units 312a-n are operating at or above a threshold power level.

Figure 4A:
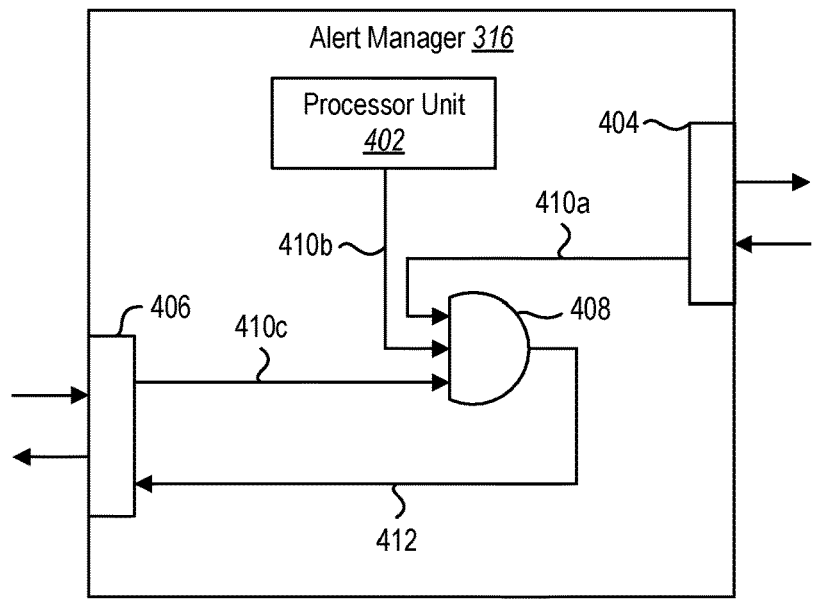
FIG. 4A illustrates an example implementation of an alert manager on a power management control system in accordance with one or more implementations.

Additional information in connection with identifying various trigger conditions is discussed in connection with FIG. 4A. For example, FIG. 4A illustrates an example alert manager 316 implemented within the power management control system 314. As shown in FIG. 4A, the alert manager 316 includes a processor unit 402, which may refer to a microprocessor or any hardware device capable of executing instructions on the power management control system 314. In this example shown in FIG. 4A, the processor unit 402 manages operating of an AND gate 408 as well as other logic gates (not shown) for passing through and otherwise processing signals passing through the alert manager 316.

As further shown, the alert manager 316 includes a number of interface elements for communicating with other devices of the server rack 302 and/or server devices on a datacenter that includes the server rack 302. For example, as shown in FIG. 4A, the alert manager 316 may include a datacenter interface 404 including hardware for sending and receiving communications from devices of the datacenter. As further shown, the alert manager 316 may include a rack interface 406 including hardware for sending and receiving communications to other devices within the server rack 302.

As mentioned above, the alert manager 316 can identify a trigger condition in a variety of ways. As a first example, the alert manager 316 can receive a datacenter trigger signal 410a (e.g., a row trigger signal) from a datacenter indicating that a trigger condition has been detected and that the alert manager 316 should initiate power throttling. The datacenter trigger signal 410a may be provided directly to the AND gate 408. In addition (or alternatively), the datacenter trigger signal 410a may be provided to the processor unit 402 and then provided as an input to the AND gate 408.

As a second example, the processor unit 402 may generate a rack trigger signal 410b based on detecting a trigger condition applicable to the server rack 302. For instance, the rack manager 304 may detect a trigger condition and provide a communication to the power management control system 314 to alert the power management control system 314 of the trigger condition. In response, the processor unit 402 may generate and provide the rack trigger signal 410b as an input to the AND gate 408.

As a third example, the alert manager 316 may receive one or more supply trigger signal(s) 410c from the power supply units 312a-n based on one or more of the power supply units 312a-n detecting a trigger condition local to the power supply units 312a-n. In one or more embodiments, the alert manager 316 receives a separate signal from each of the power supply units 312a-n and combines the signals using the processor unit 402 and/or an AND gate (not shown) to generate a supply trigger signal 410c representative of whether one or more of the power supply units 312a-n is operating at or above a threshold power level. Similar to the datacenter trigger signal 410a and the rack trigger signal 410b, the supply trigger signal 410c may be provided as an input to the AND gate 408.

Based on any of the trigger signals 410a-c, the AND gate 408 may output a throttle signal 412. The throttle signal 412 may be used to change a voltage of the busbar unit 308 from an operating voltage to a notification voltage. For example, the throttle signal 412 may be provided to one or more (e.g., all) of the power supply units 312a-n to cause the power supply units 312a-n to decrease or increase a supply voltage of the busbar unit 308. As discussed above, and as will be discussed further below, the change in voltage of the busbar unit 308 may serve as a notification or command to server devices of the server rack 302 to throttle power consumption in response to the identified trigger condition.

Figure 4B:
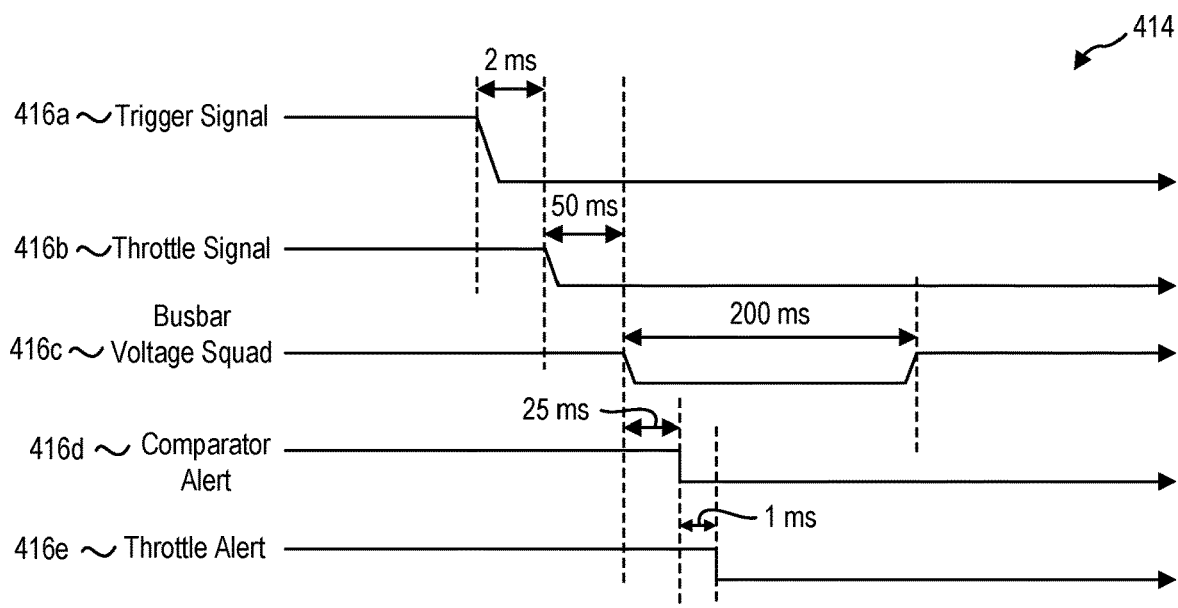
FIG. 4B illustrates an example implementation of a signal diagram for generating and providing a throttle alert to one or more server devices in accordance with one or more implementations.

FIG. 4B illustrates an example signal diagram 414 showing one implementation of throttling power consumption on server devices of a server rack. Also shown in FIG. 4B are timings of specific signals relative to one another. It will be understood that specific timings are provided by way of example in accordance with one or more implementations described herein. Nevertheless, other timings may be used in other implementations. Moreover, it will be understood that the illustrated example of the signal diagram 414 is not drawn to scale or proportional to voltage values or with respect to timing between signals being asserted relative to one another.

As shown in FIG. 4B, a trigger signal 416a may be asserted based on an identified trigger condition. The trigger signal 416a may refer to any of the trigger signals 410a-c received from a datacenter, a processor unit, a rack manager, or a throttle signal received from one of the plurality of power supply units. As discussed above in connection with FIG. 4A, the trigger signal 416a may be provided as a signal to an AND gate, which may output a throttle signal 416b. For instance, 2 milliseconds (ms) after asserting the trigger signal 416a (or other period of time based on a clock speed of the processor unit 402), the throttle signal 416b may be provided as an input to the power supply units on the power shelf.

The power shelf (e.g., the power management control system) may cause the busbar voltage to change from an operating voltage (e.g., 50 V) to a notification voltage (e.g., 48 V). As shown in FIG. 4B, a busbar voltage signal 416c may be decreased based on the throttle signal 416b (e.g., after 50 ms or other small delay). In one or more embodiments, the busbar voltage signal 416c may be changed for a predetermined length of time (e.g., 200 ms) and then changed back to the operating voltage.

In response to the busbar voltage signal 416c changing from the operating voltage to the notification voltage, a comparator alert signal 416d may be generated. For example, a server device (e.g., a comparator circuit on the server device) may assert the comparator alert signal 416d based on observing the drop (or other change) in the busbar voltage signal 416c. The comparator alert signal 416d may be asserted after a short delay (e.g., 25 ms). As shown in FIG. 4B, the server device may generate a throttle alert signal 416e after a short delay (e.g. 1 ms) after detecting assertion of the comparator alert signal 416d.

In accordance with one or more embodiments described herein, the throttle alert signal 416e may serve as a power throttle command that causes the server device to throttle power consumption by one or more processors for a predetermined period of time. For example, the server device may throttle power consumption for a few seconds or until receiving an updated command from the power management control system or rack manager. In one or more embodiments, the server device throttles power consumption for a period of time and at a predetermined frequency based on a power capping policy. The power capping policy may be unique to the server device. Alternatively, the power capping policy may include a similar set of policies for each of the server devices on the server rack.

As mentioned above, the busbar signal (e.g., the voltage signal being supplied via the busbar unit) may alert components of the server rack to throttle power consumption in a variety of ways. In particular, the power management control system may cause the busbar signal to change voltages in a variety of ways. FIGS. 5A-5D illustrate some example implementations in which the power management control system provides a command or notification to the server devices to throttle power consumption based on different changes to the DC power supply signal on the busbar unit.

Figure 5A:
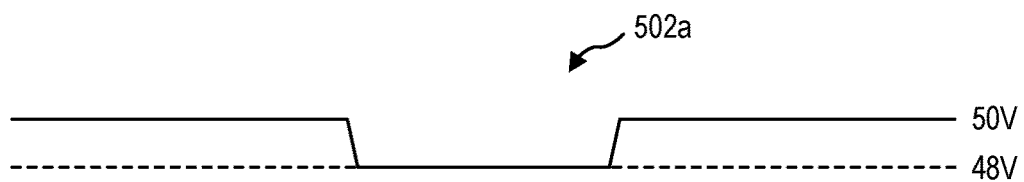
FIGS. 5A-5D illustrates various example implementations of throttle signals that may be generated in response to various trigger conditions in accordance with one or more implementations.

FIG. 5A shows a DC power supply signal 502a in accordance with a first example. In particular, as shown in FIG. 5A, the power management control system can cause the DC power supply signal 502a on the busbar unit to decrease from an operating voltage of 50 V to a notification voltage of 48 V. In one or more embodiments, the power management control system can cause the DC power supply signal 502a to decrease by more or less than 2 V. For example, the power management control system can cause the DC power supply signal 502a to decrease to any voltage value within 5% of the operating voltage. Indeed, the power management control system can decrease the voltage value of the DC power supply signal 502a on the busbar unit to any voltage that a comparator circuit is capable of identifying while still enabling the power supply units and server devices to power services and applications hosted on the server devices.

Figure 5B:
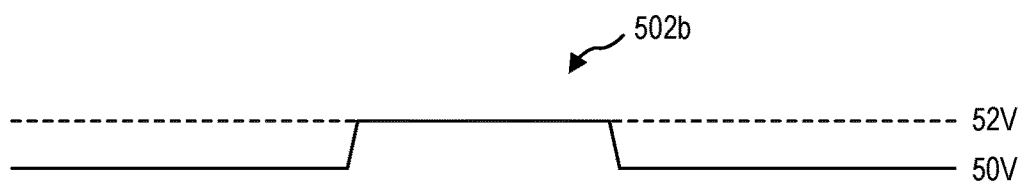

FIG. 5B shows another DC power supply signal 502b in accordance with a second example. In particular, as shown in FIG. 5B, the power management control system can cause the DC power supply signal 502b on the busbar unit to increase from an operating voltage of 50 V to a notification voltage of 52 V. In one or more embodiments, the power management control system can cause the DC power supply signal 502b to increase by more or less than 2 V. For example, the power management control system can cause the DC power supply signal 502b to increase to any voltage value within 5% of the operating voltage. Indeed, the power management control system can increase the voltage value of the DC power supply signal 502b on the busbar unit to any voltage that a comparator circuit is capable of identifying while still enabling the power supply units and server devices to power services and applications hosted on the server devices.

Figure 5C:
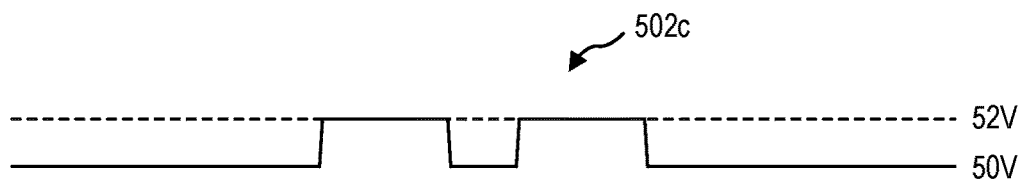

FIG. 5C shows another DC power supply signal 502c in accordance with a third example. In this example, the power management control system can generate multiple pulses of the DC power supply signal 502c in providing the throttle command to the server devices. For example, the power management control system can increase the voltage of the DC power supply signal to 52V from 50 V in two short pulses.

Figure 5D:
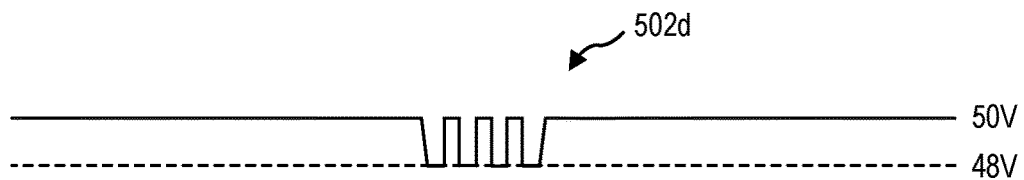

FIG. 5D shows another DC power supply signal 502d in accordance with a fourth example. In this example, the power management control system can modulate the DC power supply signal 502d between an operating voltage and a notification voltage. The power management control system can modulate the signal any number of times in accordance with one or more embodiments described herein.

While the different DC power signals 502a-d provide illustrative examples in which a power management control system can provide a throttle command to server devices of a server rack via a busbar unit, the different varieties of DC power signals 502a-d may similarly enable the power management control system to generate and provide a variety of different commands to the server devices. For example, a first type of change to the DC power supply signal may indicate a power throttle command in accordance with one or more embodiments described herein. A second type of change to the DC power supply signal, however, may indicate a power shaving command, such as shutting down or resetting hardware on the server devices rather than simply slowing operation of a processor.

As another example, different types of changes to the DC power supply signal may provide selective commands to the different server devices. For example, a first combination of pulses to the DC power supply signal may be associated with selectively implementing a power throttling action on a first server device without causing each of the server devices on the server rack to similarly implement power throttling actions. Similarly, a second combination of pulses to the DC power supply signal may be associated with selectively implementing power throttling actions on a second server device.

Figure 6:
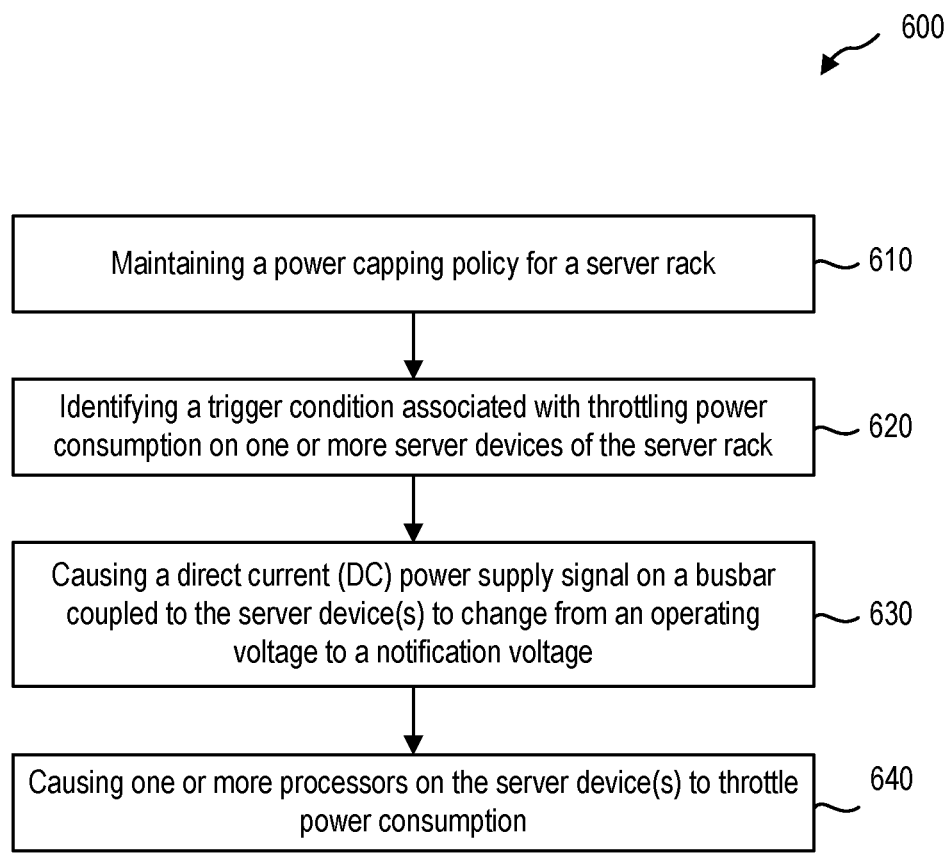
FIG. 6 illustrates an example series of acts for detecting a power throttling condition and causing one or more server devices to throttle power in accordance with one or more implementations.
Figure 7:
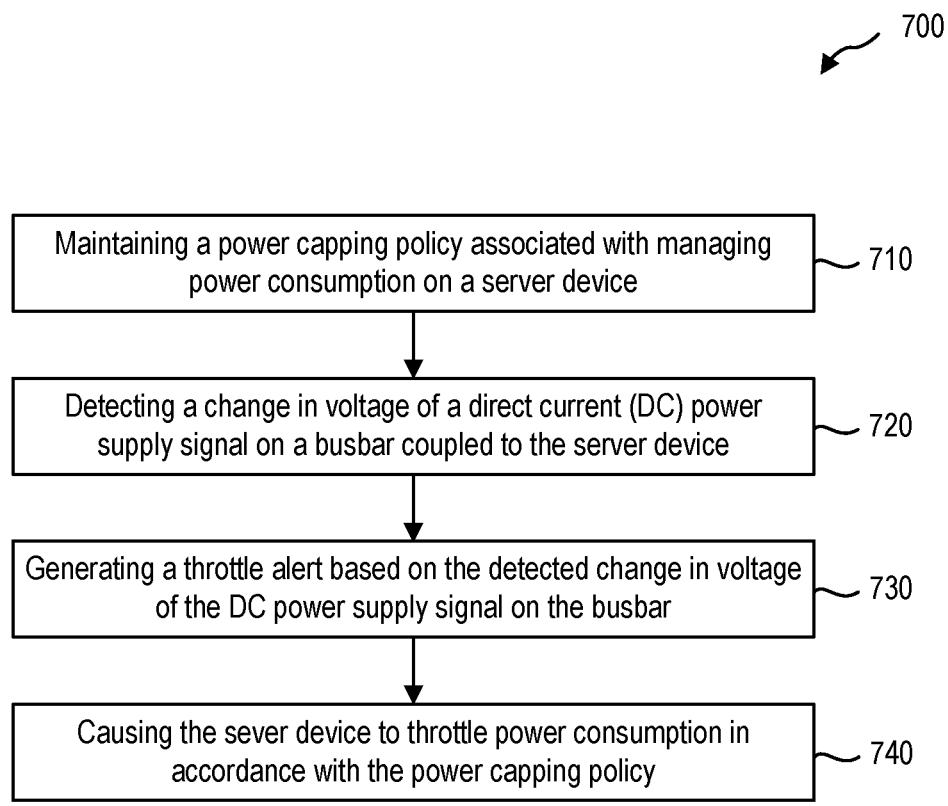
FIG. 7 illustrates an example series of acts for receiving a throttle signal and causing a server device to throttle power in accordance with one or more implementations.

Turning now to FIGS. 6-7, these figures illustrate example flowcharts including a series of acts for detecting a trigger condition (e.g., a power throttling trigger condition) and causing server devices to implement power throttling actions in response to the trigger condition. While FIGS. 6-7 illustrate acts according to one or more embodiments, alternative embodiments may omit, add to, reorder, and/or modify any of the acts shown in FIGS. 6-7. The acts of FIGS. 6-7 can be performed as part of a method. Alternatively, a non-transitory computer-readable medium can include instructions that, when executed by one or more processors, cause a computing device to perform the acts of FIGS. 6-7. In still further embodiments, a system can perform the acts of FIGS. 6-7.

For example, FIG. 6 illustrates a series of acts 600 for implementing power throttling actions in response to an identified trigger condition. In one or more implementations, the series of acts 600 is performed by a shelf unit on a server rack. As shown in FIG. 6, the series of acts 600 includes an act 610 of maintaining a power capping policy for a server rack. For example, in one or more implementations, the act 610 involves maintaining a power capping policy for a server rack with the power capping policy including instructions for managing power consumption on a plurality of server devices of the server rack.

As further shown, the series of acts 600 includes an act 620 of identifying a trigger condition associated with throttling power consumption on one or more server devices of the server rack. For example, in one or more embodiments, the act 620 includes identifying, by a power shelf unit, a trigger condition from the power capping policy where the trigger condition is associated with throttling power consumption on one or more server devices of the server rack.

In one or more implementations, identifying the trigger condition includes receiving a notification indicating that a datacenter colo including the server rack is operating at or above a threshold power level. In one or more implementations, identifying the trigger condition includes receiving a notification indicating that the plurality of server devices are operating at or above a threshold power level. In one or more implementations, identifying the trigger condition includes receiving, from one or more power supply units on the power shelf unit, an indication that at least one of a plurality of power supply units is operating at or above a threshold power level.

As further shown, the series of acts 600 includes an act 630 of causing a direct current (DC) power supply signal on a busbar coupled to the server device(s) to change from an operating voltage to a notification voltage. For example, in one or more implementations, the act 630 involves in response to identifying the trigger condition, causing a direct current (DC) power supply signal on a busbar to change from an operating voltage to a notification voltage, the busbar being coupled to the power shelf unit and the plurality of server devices.

As further shown, the series of acts 600 may include an act 640 of causing one or more processors on the server device(s) to throttle power consumption. For example, in one or more implementations, the act 640 involves causing one or more processors on the one or more server devices to throttle power consumption on the one or more server devices. In one or more implementations, causing the DC power supply signal on the busbar to change from the operating voltage to the notification voltage involves causing one or more processors on the one or more server devices to throttle power consumption on the one or more server devices.

In one or more embodiments, causing the DC power supply signal on the busbar to change from the operating voltage to the notification voltage includes causing a voltage of the DC power supply signal on the busbar to increase or decrease by a predetermined voltage. The predetermined voltage may include any voltage that is less than or equal to 5% of the operating voltage (or other range of voltage that enables the server device(s) to maintain a threshold level of operation while detecting the change in supply voltage on the busbar).

In one or more implementations, the operating voltage is a first voltage and the notification voltage is a second voltage that is less than the first voltage. In one or more implementations, the DC power supply signal on the busbar is changed from the first voltage to the second voltage for a predetermined period of time. Alternatively, in one or more implementations, the operating voltage is a first voltage and the notification voltage is a second voltage that is higher than the first voltage. Similarly, the DC power supply signal on the busbar may be changed from the first voltage to the second voltage for a predetermined period of time.

In one or more implementations, causing the DC power supply signal on the busbar to change from the operating voltage to the notification voltage causes the one or more processors on the one or more server devices to throttle power consumption by decreasing a clock cycle of the one or more processors based on instructions from the power capping policy associated with the identified trigger condition. Further, in one or more implementations, each of a plurality of server devices on the server rack are coupled to the power shelf unit via the busbar. In this example, causing the DC power supply signal on the busbar to change from the operating voltage to the notification voltage may cause each server device on the server rack to throttle power consumption for a predetermined period of time based on the power capping policy.

FIG. 7 illustrates a series of acts 700 for identifying a change in a DC power supply signal and causing a server to throttle power consumption in response to the identified change. For example, the series of acts includes an act 700 of maintaining a power capping policy associated with managing power consumption on a server device. In one or more implementations, the act 710 involves a server device (e.g., from a plurality of server devices on a server rack) maintaining a power capping policy associated with managing power consumption on the server device.

As further shown, the series of acts 700 may include an act 720 of detecting a change in voltage of a DC power supply signal on a busbar coupled to the server device. For example, in one or more implementations, the act 720 involves detecting, by a comparator circuit on the server device, a change in voltage of a direct current (DC) power supply signal on a busbar coupled to the server device, the change in voltage of the DC power supply signal on the busbar including a change from an operating voltage to a notification voltage.

In one or more embodiments, detecting the change in voltage of the DC power supply signal on the busbar comprises detecting an increase or a decrease in voltage of the DC power supply signal by a predetermined voltage. The predetermined voltage may refer to any voltage less than or equal to 5% of the operating voltage. In one or more embodiments, the operating voltage is a first voltage and the notification voltage is a second voltage that is less than the first voltage. Alternatively, in one or more embodiments, the operating voltage is a first voltage and the notification voltage is a second voltage that is higher than the first voltage. In one or more implementations, detecting the change in voltage of the DC power supply signal on the busbar comprises detecting a decrease in voltage from the first voltage to the second voltage for a predetermined period of time. In one or more embodiments, detecting the change in voltage of the DC power supply signal includes detecting a modulation of the DC power supply signal between the operating voltage and the notification voltage over a predetermined period of time.

As further shown, the series of acts 700 may include an act 730 of generating a throttle alert based on the detected change in voltage of the DC power supply signal on the busbar. For example, in one or more implementations, the act 730 involves generate, by the comparator circuit, a throttle alert based on the detected change in voltage of the DC power supply signal on the busbar.

As further shown, the series of acts 700 may include an act 740 of causing the server device to throttle power consumption in accordance with the power capping policy. For example, in one or more implementations, the act 740 involves, based on the throttle alert, causing the server device to throttle power consumption to a predetermined power level in accordance with the power capping policy.

In one or more embodiments, the series of acts 700 includes providing the throttle alert to a baseboard management controller on a motherboard of the server device. Providing the throttle alert to the baseboard management controller may cause at least one processor on the server device to run at a lower frequency for a predetermined period of time.

In one or more embodiments, the power capping policy includes a plurality of actions associated with different types of changes in the voltage of the DC power supply signal on the busbar. Further, in one or more embodiments, generating the throttle alert includes identifying a first action from the plurality of actions based on a type of change of the detected change in voltage of the DC power supply signal on the busbar from the operating voltage to the notification voltage.

Figure 8:
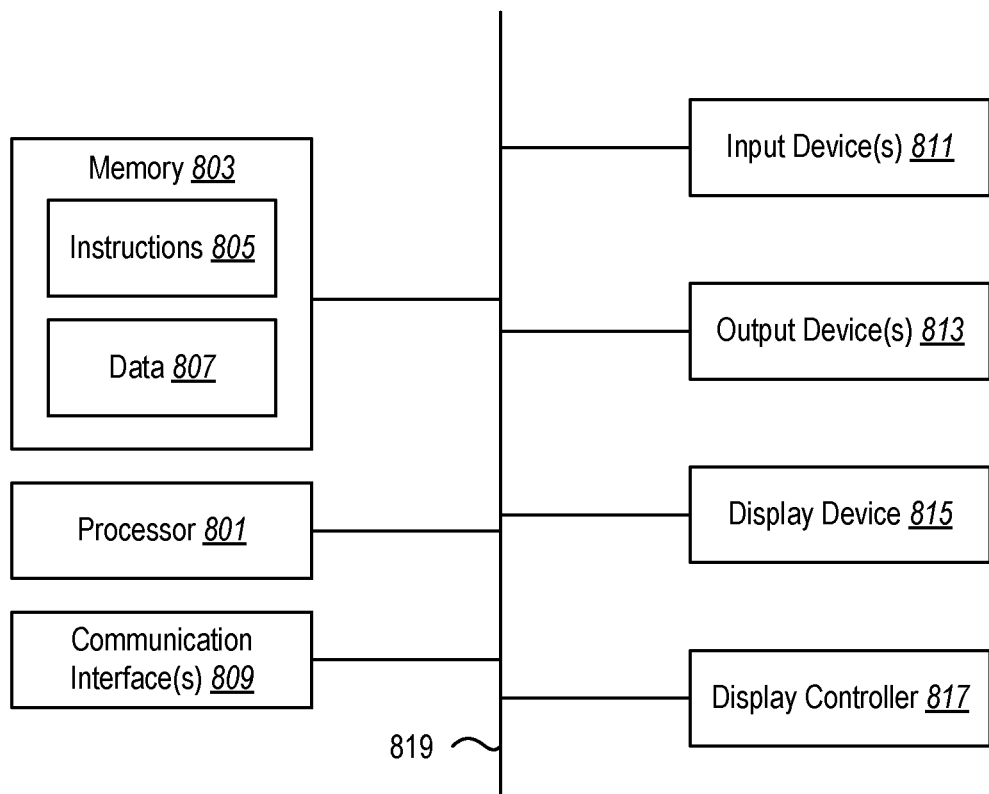
FIG. 8 certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   maintaining a power capping policy for a server rack, the power capping policy including instructions for managing power consumption on a plurality of server devices of the server rack;
   identifying, by a power shelf unit, a trigger condition from the power capping policy, the trigger condition being associated with throttling power consumption on one or more server devices of the server rack; and
   in response to identifying the trigger condition, causing a direct current (DC) power supply signal on a busbar to change from an operating voltage to a notification voltage, the busbar being coupled to the power shelf unit and the plurality of server devices,
   wherein causing the DC power supply signal on the busbar to change from the operating voltage to the notification voltage causes one or more processors on the one or more server devices to throttle power consumption on the one or more server devices.

2. The method of claim 1, wherein identifying the trigger condition comprises receiving a notification indicating that a colocation center including the server rack is operating at or above a threshold power level.

3. The method of claim 1, wherein identifying the trigger condition comprises receiving a notification indicating that the plurality of server devices are operating at or above a threshold power level.

4. The method of claim 1, wherein identifying the trigger condition comprises receiving, from one or more power supply units on the power shelf unit, an indication that at least one of a plurality of power supply units is operating at or above a threshold power level.

5. The method of claim 1, wherein causing the DC power supply signal on the busbar to change from the operating voltage to the notification voltage includes causing a voltage of the DC power supply signal on the busbar to increase or decrease by a predetermined voltage, the predetermined voltage being less than or equal to 5% of the operating voltage.

6. The method of claim 1, wherein the operating voltage is a first voltage and the notification voltage is a second voltage that is less than the first voltage, and wherein the DC power supply signal on the busbar is changed from the first voltage to the second voltage for a predetermined period of time.

7. The method of claim 1, wherein the operating voltage is a first voltage and the notification voltage is a second voltage that is higher than the first voltage, and wherein the DC power supply signal on the busbar is changed from the first voltage to the second voltage for a predetermined period of time.

8. The method of claim 1, wherein causing the DC power supply signal on the busbar to change from the operating voltage to the notification voltage causes the one or more processors on the one or more server devices to throttle power consumption by decreasing a clock cycle of the one or more processors based on instructions from the power capping policy associated with the identified trigger condition.

9. The method of claim 1, wherein each of a plurality of server devices on the server rack are coupled to the power shelf unit via the busbar, and wherein causing the DC power supply signal on the busbar to change from the operating voltage to the notification voltage causes each server device on the server rack to throttle power consumption for a predetermined period of time based on the power capping policy.

10. A server device on a server rack comprising a plurality of server devices, the server device comprising:
    one or more processors;
    memory in electronic communication with the one or more processors; and
    instructions stored in the memory, the instructions being executable by the one or more processors to cause the server device to:
      maintain a power capping policy associated with managing power consumption on the server device;
      detect, by a comparator circuit on the server device, a change in voltage of a direct current (DC) power supply signal on a busbar coupled to the server device, the change in voltage of the DC power supply signal on the busbar including a change from an operating voltage to a notification voltage;
      generate, by the comparator circuit, a throttle alert based on the detected change in voltage of the DC power supply signal on the busbar; and
      based on the throttle alert, causing the server device to throttle power consumption to a predetermined power level in accordance with the power capping policy.

11. The server device of claim 10, wherein detecting the change in voltage of the DC power supply signal on the busbar comprises detecting an increase or a decrease in voltage of the DC power supply signal by a predetermined voltage, the predetermined voltage being less than or equal to 5% of the operating voltage.

12. The server device of claim 10, wherein the operating voltage is a first voltage and the notification voltage is a second voltage that is less than the first voltage, and wherein detecting the change in voltage of the DC power supply signal on the busbar comprises detecting a decrease in voltage from the first voltage to the second voltage for a predetermined period of time.

13. The server device of claim 10, wherein the operating voltage is a first voltage and the notification voltage is a second voltage that is higher than the first voltage, and wherein detecting the change in voltage of the DC power supply signal on the busbar comprises detecting an increase in voltage from the first voltage to the second voltage for a predetermined period of time.

14. The server device of claim 10, wherein detecting the change in voltage of the DC power supply signal comprises detecting a modulation of the DC power supply signal between the operating voltage and the notification voltage over a predetermined period of time.

15. The server device of claim 10, further comprising providing the throttle alert to a baseboard management controller on a motherboard of the server device, wherein providing the throttle alert to the baseboard management controller causes at least one processor on the server device to run at a lower frequency for a predetermined period of time.

16. The server device of claim 10, wherein the power capping policy includes a plurality of actions associated with different types of changes in the voltage of the DC power supply signal on the busbar, wherein generating the throttle alert comprises identifying a first action from the plurality of actions based on a type of change of the detected change in voltage of the DC power supply signal on the busbar from the operating voltage to the notification voltage.

17. A system, comprising:
one or more processors;
memory in electronic communication with the one or more processors;
instructions stored in the memory, the instructions being executable by the one or more processors to cause a power shelf unit to:
maintain a power capping policy for a server rack, the power capping policy including instructions for managing power consumption on a plurality of server devices of the server rack;
identify a trigger condition from the power capping policy, the trigger condition being associated with throttling power consumption on one or more server devices of the server rack; and
in response to identifying the trigger condition, cause a direct current (DC) power supply signal on a busbar to change from an operating voltage to a notification voltage, the busbar being coupled to the power shelf unit and the plurality of server devices,
wherein causing the DC power supply signal on the busbar to change from the operating voltage to the notification voltage causes one or more processors on the one or more server devices to throttle power consumption on the one or more server devices.

18. The system of claim 17, wherein identifying the trigger condition comprises one or more of:
receiving a notification indicating that a colocation center including the server rack is operating at or above a threshold power level;
receiving a notification indicating that the plurality of server devices are operating at or above a threshold power level; or
receiving, from one or more power supply units on the power shelf unit, an indication that at least one of a plurality of power supply units is operating at or above a threshold power level.

19. The system of claim 17, wherein causing the DC power supply signal on the busbar to change from the operating voltage to the notification voltage includes causing a voltage level of the busbar to increase or decrease by a predetermined voltage, the predetermined voltage being less than or equal to 5% of the operating voltage.

20. The system of claim 17,
wherein the operating voltage is a first voltage and the notification voltage is a second voltage that is less than the first voltage, and wherein the DC power supply signal is changed from the first voltage to the second voltage for a predetermined period of time, or
wherein the operating voltage is a first voltage and the notification voltage is a second voltage that is higher than the first voltage, and wherein the DC power supply signal is changed from the first voltage to the second voltage for a predetermined period of time.

* * * * *